(12) United States Patent
Yang et al.

(10) Patent No.: US 9,596,652 B2
(45) Date of Patent: Mar. 14, 2017

(54) WIRELESS WAKE-UP DEVICE FOR CELLULAR MODULE

(71) Applicant: INTEL CORPORATION, Santa Clara, CA (US)

(72) Inventors: Hua Yang, Shanghai (CN); Hu Xu, Tai An (CN); Zhengtao Peng, Wuhan (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/958,033

(22) Filed: Dec. 3, 2015

(65) Prior Publication Data

US 2016/0105851 A1 Apr. 14, 2016

Related U.S. Application Data

(63) Continuation of application No. 13/977,589, filed as application No. PCT/CN2012/073090 on Mar. 27, 2012, now Pat. No. 9,226,239.

(51) Int. Cl.
| | |
|---|---|
| *H04W 52/02* | (2009.01) |
| *H04L 12/12* | (2006.01) |
| *H04W 68/02* | (2009.01) |
| *H04W 76/04* | (2009.01) |
| *H04W 4/12* | (2009.01) |
| *H04W 88/06* | (2009.01) |
| *H04W 4/16* | (2009.01) |
| *H04M 1/57* | (2006.01) |

(52) U.S. Cl.
CPC ......... *H04W 52/0229* (2013.01); *H04L 12/12* (2013.01); *H04M 1/57* (2013.01); *H04W 4/12* (2013.01); *H04W 4/16* (2013.01); *H04W 68/025* (2013.01); *H04W 76/048* (2013.01); *H04W 88/06* (2013.01)

(58) Field of Classification Search
None
See application file for complete search history.

(56) References Cited

U.S. PATENT DOCUMENTS 9,226,239 B2 * 12/2015 Yang ................ H04L 12/12
2008/0032662 A1 2/2008 Tu
(Continued)

FOREIGN PATENT DOCUMENTS

| CN | 1997230 A | 7/2007 |
|---|---|---|
| CN | 101141264 A | 3/2008 |

(Continued)

OTHER PUBLICATIONS

U.S. Appl. No. 13/977,589, Notice of Allowance, Jul. 31, 2015, 19 pages.
(Continued)

*Primary Examiner* — Diane Mizrahi
(74) *Attorney, Agent, or Firm* — Stoel Rives LLP

(57) ABSTRACT

A control device may wake-up a target wireless device through a wired or wireless communications channel. In an implementation, the control device and the wireless device may include a cellular module (e.g., global systems for mobile communications (GSM) capability) to implement an on-demand wake-up call. The on-demand wake-up call may allow the control device to perform at least one task at the wireless device without user intervention at the wireless device.

30 Claims, 5 Drawing Sheets

(56) References Cited

U.S. PATENT DOCUMENTS

| | | | |
|---|---|---|---|
| 2008/0218309 A1 | 9/2008 | Steenstra et al. | |
| 2012/0290950 A1* | 11/2012 | Rapaport | H04L 51/32 |
| | | | 715/753 |
| 2013/0182614 A1 | 7/2013 | Kumar et al. | |
| 2013/0303085 A1* | 11/2013 | Boucher | H04W 4/008 |
| | | | 455/41.1 |
| 2014/0056293 A1 | 2/2014 | Kumar et al. | |

FOREIGN PATENT DOCUMENTS

| | | |
|---|---|---|
| CN | 101364973 A | 2/2009 |
| WO | 2013143063 A1 | 10/2013 |

OTHER PUBLICATIONS

PCT/CN2012/073090, International Search Report and Written Opinion, Issued May 31, 2012, 11 pages.

\* cited by examiner

WIRELESS WAKE-UP DEVICE FOR CELLULAR MODULE

BACKGROUND

When a mobile device with a cellular module, such as a smartphone, is not in use, it remains in sleeping state, with an application processor in hibernation, and/or WiFi connection and/or cellular data channel switched off to save power. Before a user may operate the cellular device, the cellular device needs to be awaken. In other words, the cellular device needs the application processor to be in active mode, or the WiFi connection and/or the cellular data channel re-established. Currently, in-time notification delivery of updates is important, such that a conventional cellular device wakes up from sleep state every few minutes to re-establish either the WiFi connection and/or the cellular data channel to check updates. A drawback of this operation is a waste of power in the cellular device, in the case of no updates that are actually present for the cellular device. For example, the cellular device is configured to wake up every few minutes even though the next update or notification, such as an email message, will arrive after a few hours.

Accordingly, software and hardware solutions may be implemented to perform remote wireless wake-up on the wireless device to achieve on-time notification of updates with additional power savings in the wireless device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

A control device may include a cellular module (e.g., global systems for mobile communications (GSM) capability) to wake-up a target wireless device through a wired or wireless communications channel. In an implementation, the control device may include a control platform that manages interactions between the control device and the target wireless device after the communications channel is established. For example, the control platform in the control device may communicate with a task scheduler component in the target wireless device to perform a pre-configured task. The task scheduler component may reside on the target wireless device to perform the pre-configured task for a particular wake-up call. In an implementation, pre-configured one or more wake-up calls (e.g., identification numbers) are stored at the target wireless device as one or more caller identification numbers. Each caller identification number may respectively correspond to a particular wake-up call. Similarly, each caller identification number may represent at least one scheduled task for the particular wake-up call. In an implementation, the first wireless device initiates (i.e., dials) a wake-up call to the target wireless device that filters whether the wake-up call is a regular/ordinary incoming voice call, or one of the stored caller identification numbers. If the wake-up call is one of the caller identification numbers, then the target wireless device may perform at least one scheduled task(s) that corresponds to the caller identification number. In certain implementations, the wake-up call may allow the device to remotely manage and control operations of the target wireless device.

In the following detailed descriptions, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Figure 1:
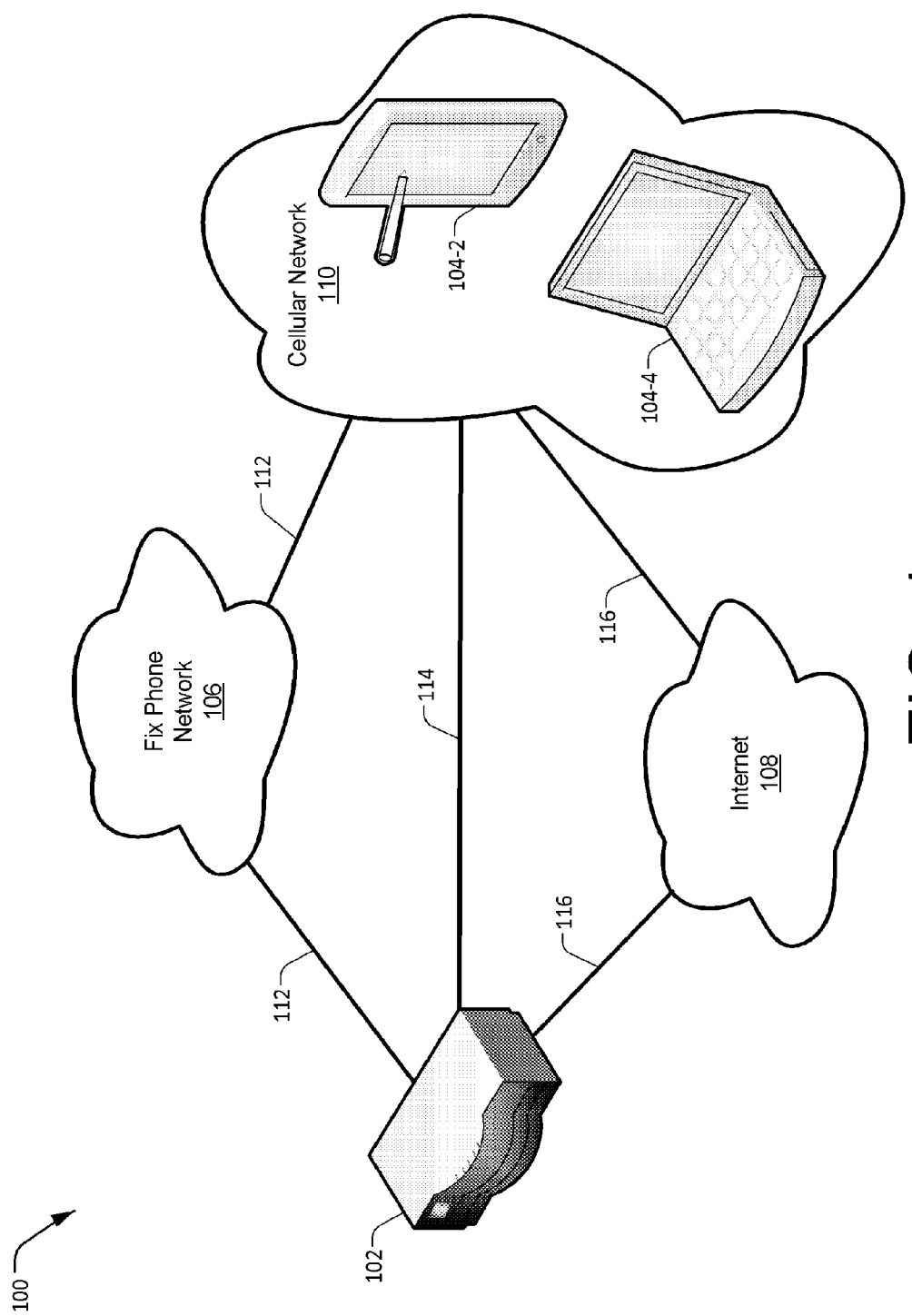
FIG. 1 is a diagram illustrating an example network system implementing remote wake-up call in wireless devices with cellular module components.

FIG. 1 illustrates an example system 100 that employs on-demand wake-up calls between devices. In an implementation, the system 100 may include a control device 102, a target wireless or wireless devices 104, a fix phone network 106, and Internet 108. In an implementation, the control device 102 and wireless devices 104 may establish communications through the fix phone network 106, or the Internet 108. Examples of such control device 102 may include wired devices such as, a server connected to the Internet 108 via an Ethernet cable, and wireless devices. Examples of wireless devices 104 may include (but are not limited to) a mobile phone, a cellular phone, a smart-phone, a personal digital assistant, a tablet computer, a netbook, a notebook computer, a laptop computer, a multimedia playback device, a digital music player, a digital video player, a navigational device, a digital camera, and the like. In an implementation, the control device 102 may include a cellular module (not shown) and/or a WiFi and/or a fixed line module to establish the communications through a cellular network 110 or the fix phone network 106 or the Internet 108. This may allow on-demand wake-up calls for the wireless devices 104 that may be geographically located far from each other (as compared to WiFi wake-up call).

In an implementation, the control device 102 may establish communications with the wireless devices 104-2 and 104-4 using the fix phone network 106. In this implementation, a wired link 112 may connect the control device 102 to the cellular network 110. The cellular network 110 may connect the wired link 112 signal to the wireless devices 104 through a wireless link (not shown).

In an implementation, the cellular module (not shown) at the control device 102 may use the cellular network 110 to connect with the wireless devices 104 through link 114. In other implementations, the control device 102 may use the Internet 108 to perform the on-demand wake-up call. For example, the Internet 108 may use gateways or routers to link the control device 102 through wired or wireless links 116. In this example, the wired links 114 may establish wired communications using interact protocol (IP) to implement the on-demand wake-up call (e.g., users may make wake-up calls to a target wireless device 104 via Skype™ or Google™ voice).

Figure 2:
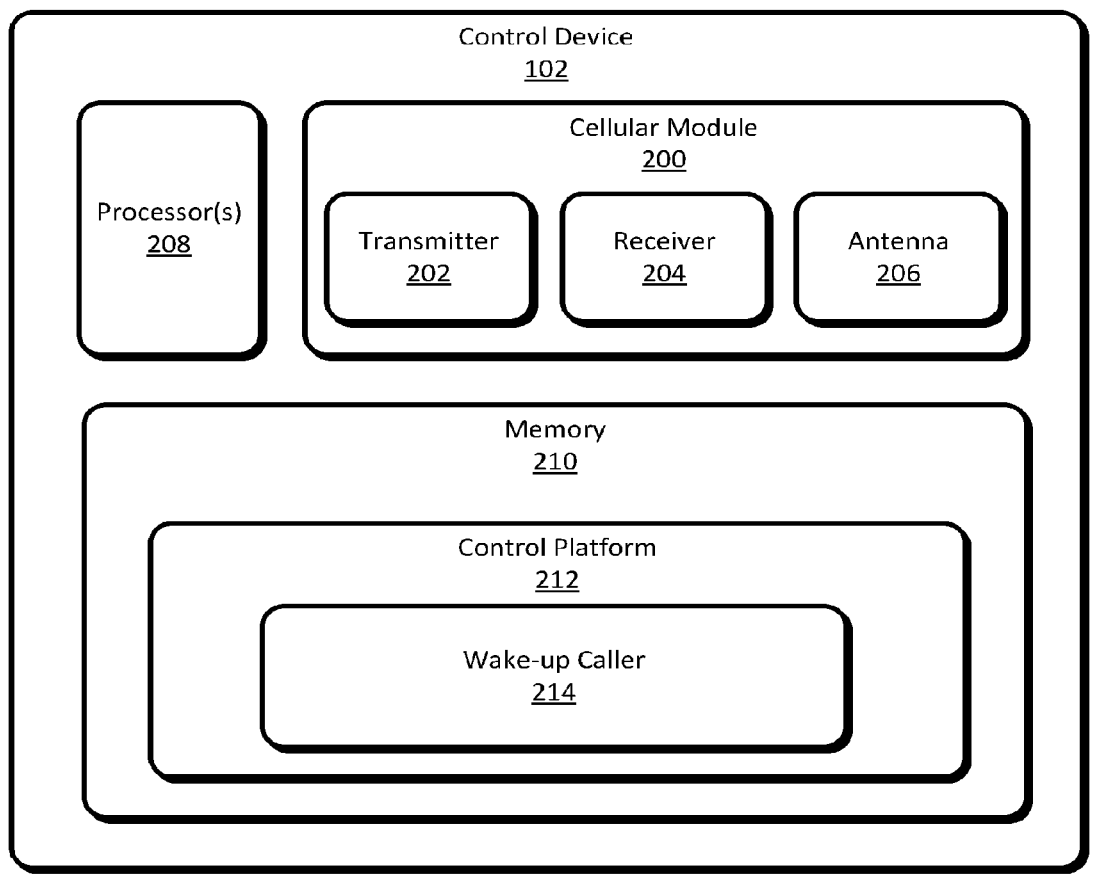
FIG. 2 is a diagram illustrating an example control device that is capable of waking up target wireless devices.

FIG. 2 is an example implementation of the control device 102 that may be used to implement on-demand wake-up calls. The control device 102 may initiate an on-demand wake-up call to the wireless devices 104. In an implementation, the control device 102 may include a server that is connected to the Internet 108 through an Ethernet cable, a WiFi or radio module 200 such as, a transmitter 202, a receiver 204 and one or more antenna 206.

The control device 102 includes one or more processor(s) 208. Processor(s) 208 may be a single processing unit or a number of processing units, all of which may include single or multiple computing units or multiple cores. The processor 208 may be implemented as one or more microprocessors, microcomputers, microcontrollers, digital signal processors, central processing units, state machines, logic circuitries, and/or any devices that manipulate signals based on operational instructions. Among other capabilities, the processor 208 may be configured to fetch and execute computer-readable instructions or processor-accessible instructions stored in a memory 210 or other computer-readable storage media.

In an implementation, the control device 102 may be configured to include a control platform 212 that manages or controls wired or wireless on-demand wake-up call by the control device 102 to a target wireless device (e.g., wireless device 104). For example, the control platform 212 may include a wake-up caller 214 that is responsible for initiating and making wake-up calls to the target wireless devices 104. The wake-up caller 214 may be pre-configured to include or store wake-up identification numbers to perform a particular task at the target wireless device 104. The wake-up identification number may include a unique identification number for each particular task or tasks that a user at the control device 102 would like to perform at the target wireless device 104. For example, a wake-up identification number "0001" may be pre-configured and stored at the wake-up caller 214 to open an email picture attachment at the target wireless device 104. In this example, the user of the control device 102 may dial the target wireless device's number and identify itself with "0001" (which could be done by setting the calling number as 0001). After filtering of the wake-up identification number at the target wireless device 104, the wireless device 104 may directly open the email picture attachment without any user intervention from the wireless device 104. Furthermore, in this example, the wake-up identification number "0001" may be pre-configured and stored at the target wireless device 104 as a caller identification number. One or more caller identification numbers that are stored at the target wireless device 104 may correspond respectively to one or more wake-up identification numbers that are stored at the wake-up caller 214. In an implementation, the caller identification number may be pre-configured to represent at least one scheduled task to be performed at the target wireless device 104. Alternatively, the target wireless device 104 may only save a single caller identification number. Once getting a call from this number it will establish a WiFi, and/or cellular data connection with the control device and listen to further instruction about what actions to perform.

In certain implementations, the memory component 210 is an example of computer-readable storage media for storing instructions, which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 208 as a particular machine configured fir carrying out the operations and functions described in the implementations herein.

The example control device 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store information for access by a computing device.

Figure 3:
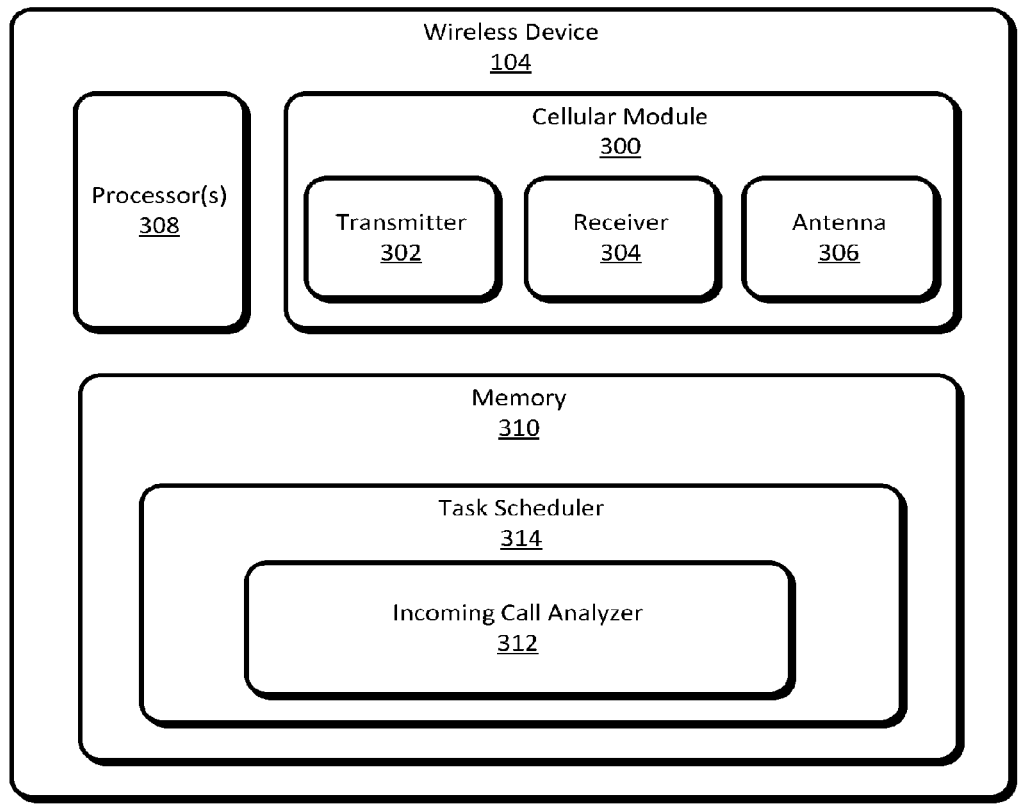
FIG. 3 is a diagram illustrating an example target wireless device that is capable of receiving wake up calls.

FIG. 3 is an example implementation of the target wireless device 104 that may be used to implement on-demand wake-up calls. The target wireless device 104 may receive the wake-up call, in an implementation, the wireless device 104 may include a cellular module 300 such as, a transmitter 302, a receiver 304 and one or more antenna 306. The cellular module 300 may be configured to receive wake-up calls while moving around a geographic area, such as the geographic area for a particular cellular network that uses the GSM standards.

The wireless device 104 includes one or more processor(s) 308. Processor(s) 308 may be a single processing unit or a number of processing units, all of which may include single or multiple computing units or multiple cores. The processor 308 may be implemented as one or more microprocessors, microcomputers, microcontrollers, digital signal processors, central processing units, state machines, logic circuitries, and/or any devices that manipulate signals based on operational instructions. Among other capabilities, the processor 308 may be configured to fetch and execute computer-readable instructions or processor-accessible instructions stored in a memory 310 or other computer-readable storage media. The computer-readable instructions or processor-accessible instructions may be used by the processor 308 to process data such as, guiding or linking the received wake-up calls in the cellular module 300 to the memory 310.

In an implementation, the target wireless device 104 may receive the incoming wake-up call. In this implementation, the wireless device 104 may be pre-configured to receive the wake-up call from the control device 102 that initiates and makes the wake-up call through a control platform (not shown). The wake-up call may include an identification number stored as the caller identification number at the wireless device 104. The caller identification number may include the wake-up call received by the target wireless device 104-2 to perform a particular task. In an implementation, the first wireless device 104 may include an incoming call analyzer 312 configured to identify whether the incoming wake-up call is a regular number for incoming voice calls, or one of the stored and pre-configured caller identification numbers. For example, the incoming call analyzer 312 through a basic comparison algorithm may determine, if the incoming wake-up call identification number (e.g., "0001") is included in the stored pre-configured caller identification numbers at the target wireless device 104. In an implementation, the basic comparison algorithm may be an application that compares data identification of the incoming wake-up call and the caller identification number. If the incoming wake-up call identification number is included in the caller identification numbers, then the wireless device 104 may perform pre-configured or scheduled task(s) for the incoming wake-up call through a task scheduler 314.

When the wireless device 104 receives an incoming call, the wireless device 104 may automatically launch an "incoming call" interface to alert the user with options to answer or reject the incoming call. In order to enable the wireless device 104 to perform other tasks, and before the "incoming call" interface is launched, the incoming call analyzer 312 filters the incoming call. If the incoming call matches one of the stored caller identification numbers in the wireless device 104, then the incoming call analyzer 312 may not launch the regular incoming call interface and instead, directs the task scheduler 314 to perform a pre-configured task. The task scheduler 314 may perform the pre-configured task(s) represented by a particular caller identification number that corresponds to the incoming call in the above example. Furthermore, the task scheduler 314 may communicate with the control platform 312 of the control device 102 in performing the pre-configured task. In other implementations, the task scheduler 314 may allow remote management or control of the target wireless device 104 without user intervention from the target wireless device 104.

In certain implementations, the memory component 310 is an example of computer-readable storage media for storing instructions, which are executed by the processor(s) 308 to perform the various functions described above. For example, memory 310 may generally include both volatile memory and non-volatile memory (e.g., RAM, ROM, or the like). Memory 310 may be referred to as memory or computer-readable storage media herein. Memory 310 is capable of storing computer-readable, processor-executable program instructions as computer program code that may be executed by the processor(s) 308 as a particular machine configured for carrying out the operations and functions described in the implementations herein.

The example wireless device 104 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store information for access by a computing device.

Example Incoming-Call Handling Call Operation

Figure 4:
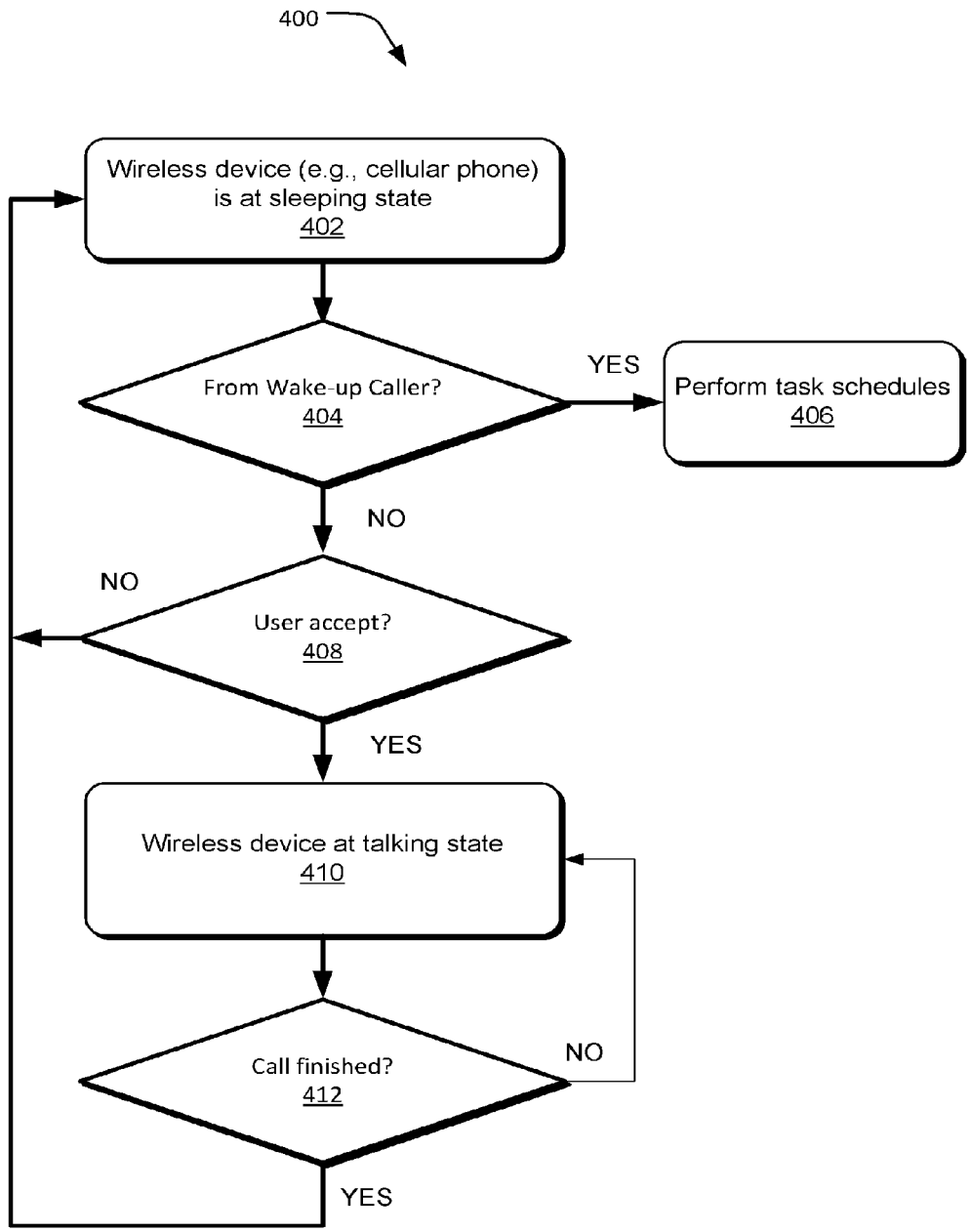
FIG. 4 is a diagram illustrating an example of incoming call handling operations in a to-be-woken-up wireless device.

FIG. 4 shows an example process chart illustrating an example wake-up operation 400 at the wireless device 104. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, at least one computer accessible medium may perform the method described below At block 402, a wireless device is at sleeping state. In an implementation, the wireless device (e.g., wireless device 104) that acts as a target wireless device is kept at sleeping state until an update is available.

At block 404, determining a wake-up caller in the wireless device 104 is performed. In an implementation, the wireless device 104 is awoken by an incoming wake-up call. When the incoming wake-up call (e.g., update) from a control device (e.g., control device 102) is trying to establish communications with the wireless device 104, the incoming wake-up call is filtered by the wireless device 104. In other words, if the incoming wake-up call is one of the stored caller identification numbers in the target wireless device, following the YES branch of block 404, block 406 is performed. At block 406, the task schedules are performed.

Otherwise following the NO branch of block 404, at block 408, accepting or rejecting the incoming regular call is performed. In an implementation, a user of the wireless device 104 may accept or reject the incoming regular call. If the user does not accept the wake up call, following the NO branch of block 408, block 402 is performed, where the wireless device goes back to sleeping state.

Otherwise, following the YES branch of block 408, at block 410, the user of accepts the incoming regular call. The wireless device is in talking state upon acceptance by the user of the incoming regular call.

At block 412 a determination is made as to terminating of call talking state is performed in the wireless device. If the call is terminated/finished, following the YES branch of block 412, the wireless device goes to sleeping state. Otherwise, following the NO branch of block 412, block 410 is performed.

Figure 5:
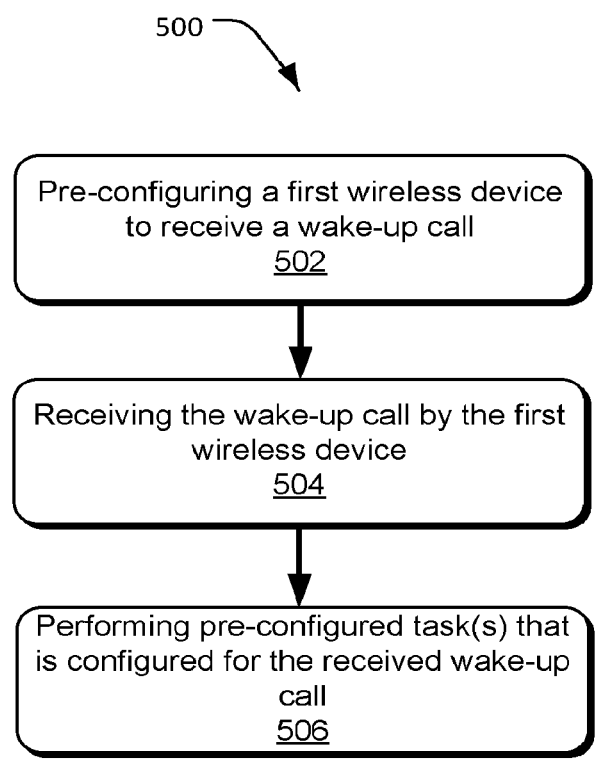
FIG. 5 is a flow chart illustrating an example method for remote wake-up call in a to-be-woken-up wireless device with cellular module component.

FIG. 5 shows an example process chart illustrating an example method for remote wireless wake-up of a wireless device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, at least one computer accessible medium may perform the method described below.

At block 502, pre-configuring a target wireless device to receive a wake-up call is performed. In an implementation, the target wireless device (e.g., wireless device 104) may be pre-configured to receive the wake-up call from a control device (e.g., control device 102). In this implementation, caller identification numbers may be stored at the target wireless device 104. The caller identification numbers may include identifications of the wake-up calls that may be received by the target wireless device 104 to perform a particular task or tasks. For example, an incoming call analyzer component (e.g., incoming call analyzer 312) at the wireless device 104 may be configured to identify or filter which incoming wake-up call number is a regular number for incoming voice calls, or a caller identification number for a pre-configured task. In this example, the incoming call analyzer 312 through a basic comparison algorithm may determine if the incoming wake-up call (data) identification is contained or included in the stored pre-configured caller identification numbers at the first or target wireless device.

At block 504, receiving the incoming wake-up call by the first or target wireless device is performed. In an implementation, the first or target wireless device may receive the incoming wake-up call through cellular module components (e.g., cellular module 300) of the first or target wireless device. In this implementation, the received wake-up call may be directed by the incoming call analyzer to a task scheduler interface (e.g., task scheduler 314) rather than being accepted by a user of the first or target wireless device. Similarly, the received wake-up call may be directed by the incoming call analyzer to connect to a WiFi computer network. The connection to the WiFi computer network may allow the first or target wireless device to perform scheduled task or tasks that may require WiFi connection (e.g., email message update in a laptop computer).

At block 506, performing pre-configured task is performed. In an implementation, the first or target wireless device may include the task scheduler 314 to perform the at least one task that is stored and pre-configured for the caller identification number corresponding to the received wake-up call. The task scheduler 314 may execute the pre-configured task(s) by itself, or by hooking up with another software that may be used to implement the pre-configured task(s). For example, the first or target wireless device receives a wake-up call number "0002," in this example, the wake-up call number "0002" may be pre-configured as a caller identification number at the first or target wireless device to represent a certain application (e.g., Yahoo™ messenger) that includes opening of video and phone conversations. When the first or target wireless device receives the wake-up call number "0002," the first or target wireless device may execute or open the Yahoo™ messenger task through the task scheduler. In another example, a call number "0003" may be pre-configured as the caller identification number that represents execution of a virus scan operation at the first or target wireless device. The virus scan operation may be implemented by software that is provided to the task scheduler to perform the virus scan operation. Alternatively the target wireless device 104 may only save a single caller identification number. Once getting a call from this number it will establish a WiFi, and/or cellular data connection with the control device and listen to further instruction about what actions to perform, in other implementations, a user at the first or target wireless device need not accept the incoming wake-up call to perform the pre-configured task(s). In other words, the first or target wireless device may be managed and remotely controlled by the second or calling wireless device.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A wireless device, comprising:
   a cellular module comprising a transmitter and a receiver; and
   one or more processors coupled to the cellular module, the one or more processors to:
      determine a caller identification number associated with a call to be received through the receiver;
      analyze the caller identification number to determine a predetermined task associated with the caller identification number, the predetermined task including at least one task selected from the group consisting of an opening of an email attachment, an automatic launch of an application, an execution of a messenger task, an opening of a messenger task, and an execution of a virus scan operation; and
      perform, rather than launch an incoming call interface that allows a user to accept or reject the call in the wireless device, the predetermined task associated with the caller identification number on the wireless device automatically and without intervention from a user of the wireless device responsive to the call associated with the caller identification number.

2. The wireless device of claim 1, wherein the predetermined task comprises a wake-up of one or more functions of the one or more processors or an activation of the one or more functions of the one or more processors.

3. The wireless device of claim 1, wherein the call to be received through the receiver is associated with a task comprising a transition from a hibernation mode of an application processor of the one or more processors to an active mode of the application processor.

4. The wireless device of claim 1, wherein the predetermined task comprises the execution of the messenger task.

5. The wireless device of claim 1, wherein the predetermined task comprises the automatic launch of the application on the wireless device.

6. The wireless device of claim 5, wherein the application is selected from a group comprising an email application, a messenger application, a photo application, a video application, and a virus scan application.

7. The wireless device of claim 1, wherein the wireless device is selected from one of a mobile phone, a cellular phone, a smart-phone, a personal digital assistant, a tablet computer, a netbook, a notebook computer, a laptop computer, a multimedia playback device, a digital music player, a digital video player, a navigational device, or a digital camera.

8. A method, comprising:
   configuring a target wireless device to:

determine a caller identification number associated with a call to be received at the target wireless device;

analyze the caller identification number to determine a predetermined task associated with the caller identification number, the predetermined task comprising at least one task selected from the group consisting of an opening of an email attachment, an automatic launch of an application, an execution of a messenger task, an opening of a messenger task, and an execution of a virus scan operation; and perform, rather than launch an incoming call interface that allows a user to accept or reject the call in the target wireless device, the predetermined task associated with the caller identification number on the target wireless device automatically and without intervention from a user of the target wireless device responsive to the call associated with the caller identification number.

9. The method of claim 8, wherein the predetermined task comprises a wake-up of one or more functions of one or more processors or activation of the one or more functions of the one or more processors of the target wireless device.

10. The method of claim 8, wherein the predetermined task comprises the execution of the messenger task.

11. The method of claim 8, wherein the predetermined task comprises the automatic launch of the application on the target wireless device.

12. The method of claim 11, wherein the application is selected from a group comprising an email application, a messenger application, a photo application, a video application, and a virus scan application.

13. At least one non-transitory computer-readable storage medium having stored thereon instructions that, when executed by one or more processors, cause the one or more processors to perform operations comprising:

configure a target wireless device to determine a caller identification number associated with a call to be received at the target wireless device;

analyze, at the target wireless device, the caller identification number to determine a predetermined task associated with the caller identification number, the predetermined task comprising at least one task selected from the group consisting of an opening of an email attachment, an automatic launch of an application, an execution of a messenger task, an opening of a messenger task, and an execution of a virus scan operation; and perform, at the target wireless device, the predetermined task associated with the caller identification number rather than launch an incoming call interface that allows a user to accept or reject the call in the target wireless device automatically and without intervention from a user of the target wireless device responsive to the call associated with the caller identification number.

14. The at least one non-transitory computer-readable storage medium of claim 13, wherein the predetermined task comprises a wake-up of one or more functions of the one or more processors or activation of the one or more functions of the one or more processors of the target wireless device.

15. The at least one non-transitory computer-readable storage medium of claim 13, wherein the call to be received at the target wireless device is associated with a task comprising a transition from a hibernation mode of an application processor of the one or more processors to an active mode of the application processor.

16. The at least one non-transitory computer-readable storage medium of claim 13, wherein the predetermined task comprises the execution of the messenger task.

17. The at least one non-transitory computer-readable storage medium of claim 13, wherein the predetermined task comprises activation of the target wireless device to establish a WiFi or cellular data connection.

18. The at least one non-transitory computer-readable storage medium of claim 17, wherein the predetermined task further comprises receive, through the WiFi or cellular data connection, further instructions or actions for the target wireless device to perform.

19. The at least one non-transitory computer-readable storage medium of claim 13, wherein the operations further configure the target wireless device to perform the predetermined task by hooking up to another software that is used to implement the pre-determined task.

20. The at least one non-transitory computer-readable storage medium of claim 13, wherein the predetermined task comprises an on-demand task that is managed and controlled remotely by a control device.

21. The at least one non-transitory computer-readable storage medium of claim 13, wherein the predetermined task comprises an update of the target wireless device.

22. The at least one non-transitory computer-readable storage medium of claim 13, wherein the predetermined task comprises the automatic launch of the application on the target wireless device.

23. The at least one non-transitory computer-readable storage medium of claim 22, wherein the application is selected from a group comprising an email application, a messenger application, a photo application, a video application, and a virus scan application.

24. The at least one non-transitory computer-readable storage medium of claim 13, wherein the call is received at the target wireless device using a global system for mobile communications (GSM) standard.

25. A method, comprising:

determining a caller identification number associated with a call;

analyzing the caller identification number to determine a predetermined task associated with the caller identification number, the predetermined task comprising at least one task selected from the group consisting of an opening of an email attachment, an automatic launch of an application, an execution of a messenger task, an opening of a messenger task, and an execution of a virus scan operation; and performing, rather than launching an incoming call interface that allows a user to accept or reject the call, the predetermined task associated with the caller identification number on a wireless device automatically and without intervention from a user of the target wireless device responsive to the call associated with the caller identification number.

26. The method of claim 25, wherein the predetermined task comprises a wake-up or activation of one or more functions of the wireless device.

27. The method of claim 25, wherein the call is associated with a task comprising a transition from a hibernation mode of an application processor of one or more processors of the wireless device to an active mode of the application processor.

28. The method of claim 25, wherein the predetermined task comprises the execution of the messenger task.

29. The method of claim 25, wherein the predetermined task comprises the automatic launch of an application on the wireless device.

30. The method of claim 29, wherein the application is selected from a group comprising an email application, a messenger application, a photo application, a video application, and a virus scan application.

\* \* \* \* \*